(12) United States Patent
    Barbier

(10) Patent No.: US 10,859,379 B2
(45) Date of Patent: Dec. 8, 2020

(54) SYSTEMS AND METHODS WITH DEAD-RECKONING

(71) Applicant: STMicroelectronics, Inc., Coppell, TX (US)

(72) Inventor: Dominique Paul Barbier, Scotts Valley, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 248 days.

(21) Appl. No.: 15/683,186

(22) Filed: Aug. 22, 2017

(65) Prior Publication Data

US 2019/0063925 A1    Feb. 28, 2019

(51) Int. Cl.
  *G01C 21/12*  (2006.01)
  *G01C 21/28*  (2006.01)

(52) U.S. Cl.
  CPC ............. *G01C 21/12* (2013.01); *G01C 21/28* (2013.01)

(58) Field of Classification Search
  CPC .................................. G01C 21/28; G01C 21/12
  See application file for complete search history.

(56) References Cited

U.S. PATENT DOCUMENTS

| | | | |
|---|---|---|---|
| 5,742,925 A | 4/1998 | Baba | |
| 5,862,511 A * | 1/1999 | Croyle | G01C 21/28 |
| | | | 701/445 |
| 6,055,479 A * | 4/2000 | Kirkhart | G01C 21/26 |
| | | | 701/490 |
| 6,081,230 A | 6/2000 | Hoshino et al. | |
| 6,415,223 B1 | 7/2002 | Lin et al. | |
| 6,522,266 B1 | 2/2003 | Soehren et al. | |
| 6,647,352 B1 * | 11/2003 | Horton | G01C 21/16 |
| | | | 702/151 |
| 6,658,353 B2 | 12/2003 | Shimizu et al. | |
| 2003/0135327 A1 | 7/2003 | Levine et al. | |
| 2007/0078594 A1 * | 4/2007 | Mori | G01C 21/12 |
| | | | 701/408 |
| 2008/0077326 A1 | 3/2008 | Funk et al. | |
| 2010/0094481 A1 * | 4/2010 | Anderson | G05D 1/0295 |
| | | | 701/1 |
| 2010/0097208 A1 | 4/2010 | Rosing et al. | |
| 2012/0221244 A1 | 8/2012 | Georgy et al. | |
| 2013/0245934 A1 * | 9/2013 | Ando | G01C 21/165 |
| | | | 701/446 |
| 2016/0123738 A1 | 5/2016 | Bellusci et al. | |

OTHER PUBLICATIONS

Eun-Hwan Shin; "Accuracy Improvement of Low Cost INS/GPS for Land Applications"; UCGE Reports, No. 20156; Geomatics Engineering; (URL: http://www.geomatics.ucalgary.ca/links/GradTheses.html); Dec. 2001; 137 pages.

(Continued)

*Primary Examiner* — Stephen Holwerda
(74) *Attorney, Agent, or Firm* — Slater Matsil, LLP

(57) ABSTRACT

In an embodiment, a method for determining a speed of a vehicle in a dead-reckoning system includes measuring a centripetal acceleration, using an accelerometer, of the vehicle traversing a curved path on a plane of travel. The method also includes measuring an angular velocity, using a gyroscope, of the vehicle. The speed of the vehicle is calculated from the centripetal acceleration and the angular velocity.

25 Claims, 9 Drawing Sheets

(56) References Cited

OTHER PUBLICATIONS

Gul, F. et al.; "Correction Technique for Velocity and Position Error of Inertial Navigation System by Celestial Observations"; School of Instrumention & Optoelectronics Engineering, Beijing University of Aeronautics and Astronautics, Beijing—100083, China, IEEE—2005 International Conference on Emerging Technologies; Sep. 17-18, Islamabad; 6 pages.

Leonard E. Miller; "Indoor Navigation for First Responders: A Feasibility Study"; Wireless Communication Technologies Group, Advanced Networking Technologies Division, Information Technology Laboratory, National Institute of Standards and Technology; Feb. 10, 2006; 56 pages.

Lobo, J. et al.; "Inertial Navigation System for Mobile Land Vehicles"; ISR—Instituto de Sistemas e Robotica, Departamento de Engenharia Electrotecnica, Universidade de Coimbra, Largo Marques de Pombal, 3000 Coimbra, Portugal; 1995, 6 pages.

Oliver J. Woodman "An Introduction to Inertial Navigation"; Technical Report UCAM-CL-TR-696, ISSN 1476-2986; No. 696; University of Cambridge Computer Laboratory; Aug. 2007; 37 pages.

Ryu, J. et al.; "Intergrating Inertial Sensors with GPS for Vehicle Dynamics Control"; (Journal of Dynamics Systems, Measurement, and Control, Jun. 2004); Department of Mechanical Engineering, Design Division, Stanford University, Stanford, CA 94305-4021, USA; 26 pages.

\* cited by examiner

-PRIOR ART-

SYSTEMS AND METHODS WITH DEAD-RECKONING

TECHNICAL FIELD

The present invention relates generally to dead-reckoning, and, in particular embodiments, to a system and method used in dead-reckoning.

BACKGROUND

Dead-reckoning is a technique that determines a moving vehicle's instantaneous position using estimates for speed, orientation, and direction with respect to a known initial position. In dead-reckoning, the vehicle's initial position is advanced by estimating its velocity over an elapsed time.

An inertial navigation system (INS) is a specific type of dead-reckoning where the instantaneous position, velocity, and orientation of a vehicle is continuously calculated using data collected from motion and rotational sensors. A typical INS comprises a processor, a motion sensor, and a rotational sensor. INSs can be utilized in a variety of vehicles, such as cars, ships, planes, spacecraft, submarines, guided missiles, or bicycles.

A frequent problem with INSs is integration drift. Integration drift is the accumulation of errors in the kinematic calculation of position and speed using acceleration. An accelerometer can be used to detect changes in acceleration. Typically, velocity (speed and direction of movement) is calculated from an integration calculation of an acceleration measurement using kinematic equations. Thus, velocity is updated whenever the accelerometer detects acceleration. Additionally, position is calculated from a double integration of the acceleration measurement using kinematic equations. However, it is well known that integration results in integration errors. In addition, a small error in the acceleration measurement, presents a large error in the calculated velocity and a larger error in the calculated position. As subsequent velocity and position values depend on prior values, these errors are compounded over time. This compounding of errors presents an inverse relationship between accuracy and elapsed time. Hence, there is a need for a better method of updating speed in a dead-reckoning system.

SUMMARY

Technical advantages are generally achieved by embodiments of this disclosure which describe systems and methods for calculating speed in a dead-reckoning system.

In accordance with an embodiment, a method for determining a speed of a vehicle in a dead-reckoning system includes measuring a centripetal acceleration, using an accelerometer sensor, of the vehicle traversing a curved path on a plane of travel. The method includes measuring an angular velocity, using a gyroscope sensor, of the vehicle and calculating the speed of the vehicle from the centripetal acceleration and the angular velocity.

In accordance with another embodiment, an apparatus includes an accelerometer, a gyroscope, a processor, and a memory storing a program to be executed in the processor. The accelerometer and gyroscope are configured to be rigidly mounted to a vehicle. The gyroscope is proximate to the accelerometer. The program includes instructions to determine whether the gyroscope detected turning of the vehicle, determine a speed of the vehicle during the turn from a centripetal acceleration detected by the accelerometer and the angular velocity detected by the gyroscope, and updating the vehicle speed in a dead-reckoning system with the determined speed.

In accordance with another embodiment, an application is embedded in a non-transitory computer readable medium and intended for execution on a dead-reckoning system. The application is configured to determine a speed of a vehicle in the dead-reckoning system travelling in a curved path in accordance with a measured centripetal acceleration and a measured angular velocity.

In accordance with another embodiment, a vehicle includes an apparatus. The apparatus includes an accelerometer, a gyroscope, a processor, and a memory storing a program to be executed in the processor. The accelerometer and gyroscope are configured to be rigidly mounted to the vehicle. The gyroscope is to be proximate to the accelerometer. The program includes instructions to determine whether the gyroscope detected turning of the vehicle, determine a speed of the vehicle during the turn from a centripetal acceleration detected by the accelerometer and the angular velocity detected by the gyroscope, and updating the vehicle speed in a dead-reckoning system with the determined speed.

In accordance with yet another embodiment, a fleet of vehicles includes a master vehicle and a plurality of slave vehicles. The master vehicle and each of the slave vehicles having a dead-reckoning system (DRS) that includes an accelerometer, a gyroscope, a processor, and a memory storing a program to be executed in the processor. The program includes instructions to determine whether the gyroscope detected a turning motion, determine a speed of the DRS during the turn from a centripetal acceleration detected by the accelerometer and an angular velocity detected by the gyroscope, and updating a speed in the DRS with the determined speed.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
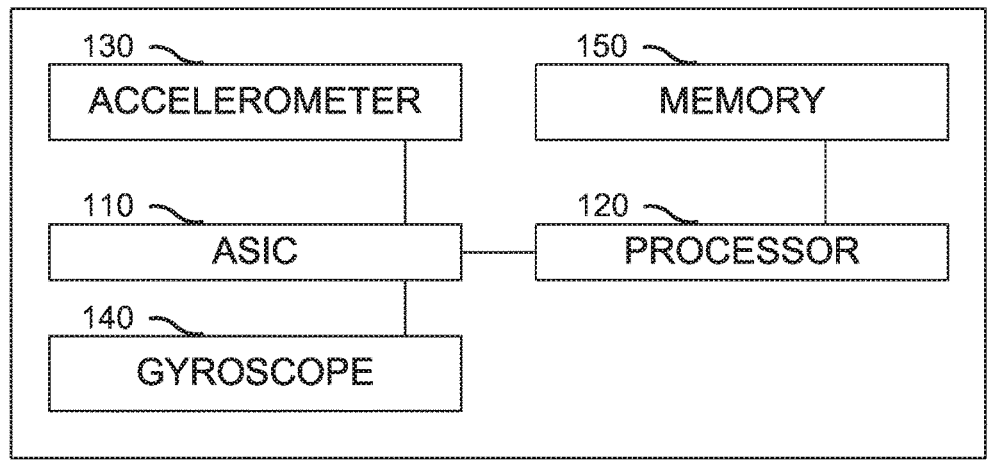
FIG. 1 illustrates a block diagram of an embodiment apparatus for calculating velocity in a dead-reckoning system.

This disclosure provides many applicable inventive concepts that can be embodied in a wide variety of specific contexts. The specific embodiments discussed are merely illustrative of specific ways to make and use the invention, and do not limit the scope of the invention.

Dead-reckoning is a technique used to estimate current state of a vehicle in reference to an initial position in accordance with an estimated velocity over time. Dead-reckoning provides a complimentary or an alternative source to respectively improve or replace data received from external sources, such as a global positioning satellite (GPS) receiver.

A navigation device may lose GPS reception or may receive poor, delayed, or inaccurate GPS reception as a result of travelling in urban areas with tall buildings, travelling through mountainous terrains, travelling inside buildings, or other such reasons including unfavorable weather. In either case, a navigation device capable of calculating a vehicle's instantaneous position, speed, and orientation using a dead-reckoning technique can replace GPS data when sensing, for example, poor GPS reception signal quality. Alternatively, a navigation device, for example, to conserve power, may use a dead-reckoning system as a primary guidance device and periodically correct its guidance using a GPS receiver.

Additionally, the altitude error in a typical GPS system is noticeably larger than errors in the horizontal plane. This is mostly as a result of optimum satellite configuration favoring horizontal accuracy at the expense of altitude accuracy. Moreover, as the earth is an imperfect ellipsoid, the referenced altitude is proximately determined. As a result, GPS systems provide a poor estimation of a vehicle's altitude. Therefore, a navigation device capable of enhancing altitude information using a dead-reckoning system is also advantageous.

In a typical inertial navigation system (INS), a processor integrates the sensed acceleration over the six degrees of freedom (three from the accelerometer and three from the gyroscope)—with an estimate to compensate for gravity (g)—over time to calculate the instantaneous velocity of a vehicle. Additionally, the INS may integrate the calculated instantaneous velocity over time to calculate the instantaneous position. A problem arises as a result of inherent noise in the measurement, which can be reduced, but not eliminated, using various techniques such as filtering. As previously stated, each integration calculation has a compounding effect resulting in large errors in dead-reckoning estimation.

In the embodiments of this disclosure, the instantaneous velocity of a vehicle, at a turn, is calculated in a dead-reckoning system using an accelerometer and a gyroscope. When a vehicle travelling at a constant speed traverses a turn, the vehicle experiences an inwards centripetal acceleration. As the reference frame of an accelerometer is contained within the traversing vehicle, the accelerometer can measure the centripetal acceleration of the vehicle in accordance with the direction of the motion. Additionally, a gyroscope can measure an angular velocity in the plane of travel of the vehicle, during the turn, when the centripetal force was experienced. A processor can calculate the instantaneous velocity of the vehicle using the accelerometer and gyroscope measurements in accordance with embodiments of this disclosure without suffering from integration drift. Additionally, the instantaneous position of the vehicle may be calculated using the calculated instantaneous velocity from an initial known position.

Aspects of this disclosure provide a dead-reckoning system (DRS) used in a navigation device that uses accelerometer and gyroscope readings sensed when the vehicle is turning. The instantaneous vehicle velocity is computed from these readings after which the velocity used in the dead-reckoning system (DRS) is updated. This improves the accuracy of a dead-reckoning system (DRS) significantly.

An embodiment of an apparatus for calculating velocity in a dead-reckoning system (DRS) will be described using FIG. 1. In FIG. 2, the pitch, yaw, and roll rate measured by a gyroscope in a dead-reckoning system (DRS) will be described. An embodiment of an object traversing a curved path along its x-y reference plane will be described using FIG. 3 for performing methods described herein. In FIGS. 4A-B, a flowchart of an embodiment for calculating velocity in a dead-reckoning system (DRS) will be described. An embodiment of an object traversing a curved path along its z-x and y-z reference planes will be described using FIGS. 5A-C for performing methods described herein. In FIG. 6, a block diagram of an embodiment navigation device for performing methods described herein will be described. An embodiment of an object having a navigation device and traversing a curved path in a three-dimensional space will be described using FIG. 7 to calculate velocity and position of an object. In FIG. 8, a flowchart of an embodiment for calculating velocity in a dead-reckoning system (DRS) of an object travelling in a three-dimensional space will be described. An embodiment of a fleet of vehicle's advantageously performing methods described herein in a dead-reckoning system (DRS) will be described using FIG. 9.

Figure 2:
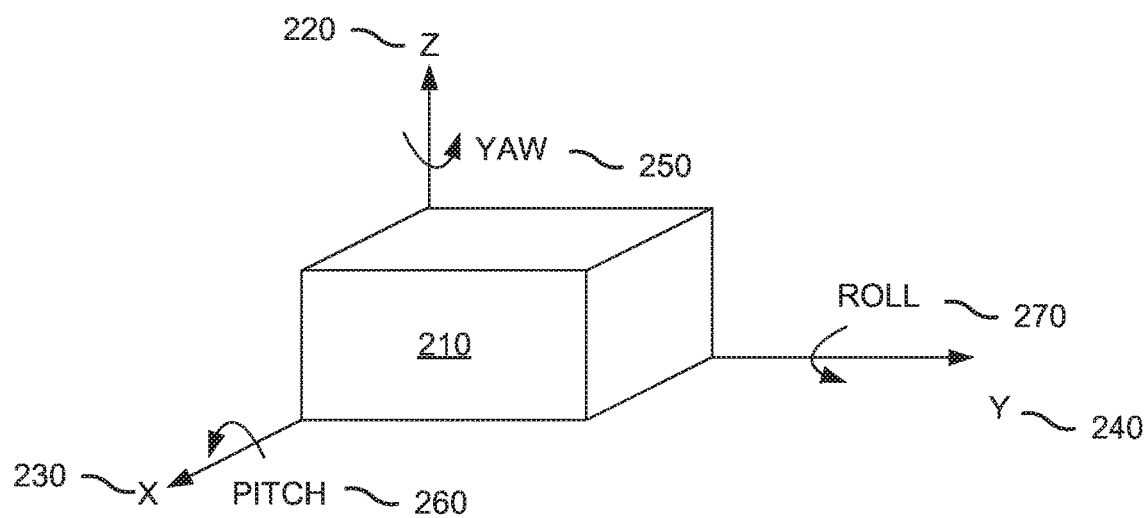
FIG. 2 illustrates an embodiment object and the corresponding axes measured by a gyroscope.

FIG. 1 illustrates a block diagram of an embodiment apparatus 100 for calculating the speed of a vehicle by measuring angular velocity and acceleration. The apparatus 100 may comprise an application specific integrated circuit (ASIC) 110, an accelerometer 130, a gyroscope 140, a memory 150, and a processor 120. In FIG. 1, only the elements necessary for understanding the structure of the apparatus 100 are illustrated and additional elements have been omitted for the sake of simplicity. Also, it would be apparent to a person skilled in the art that the apparatus 100 may comprise other functions and structures. The actual physical connection between the components may be different than the solid line logical connections as illustrated between the components in FIG. 1.

The accelerometer 130 and the gyroscope 140 may, for example, be a micro-electro-mechanical system (MEMS) device or any system capable of measuring angular velocity ($\omega$) and acceleration. The accelerometer 130 may be used to calculate the acceleration of the apparatus 100 and the gyroscope 140 may be used to calculate its angular velocity ($\omega$).

The accelerometer 130 and the gyroscope 140 may be packaged as a system-in-package featuring an accelerometer and a gyroscope in a combined MEMS sensor package that may also include the ASIC 110 with an analog-to-digital converter (ADC) (not shown). In another embodiment, the accelerometer 130 and the gyroscope 140 may each be individually packaged as individual MEMS sensors.

The ASIC 110 receives the measurements from the accelerometer 130 and the gyroscope 140, converts the measurements to a digital signal, using for example, an ADC, and transmits this data to the processor 120.

The processor 120 receives the angular velocity ($\omega$) from the gyroscope 140 and the acceleration from the accelerometer 130. The processor 120 uses this data to calculate the instantaneous linear velocity (V) of the apparatus 100. The angular velocity ($\omega$) measured by the gyroscope 140 additionally provides the vehicle's direction.

The processor 120 may, for example, be a field-programmable gate array (FPGA), a processor in a cellular phone, or any system capable of receiving data from the ASIC 110 or from the gyroscope 140 and accelerometer 130 to calculate the instantaneous velocity in the dead-reckoning system in accordance with the embodiments of this disclosure. In some embodiments, the processor 120 may alternatively be placed outside the apparatus 100. The memory 150 may be any component or collection of components adapted to store programming and/or instructions for execution by the processor 120.

Gyroscopes are generally used to measure angular velocity ($\omega$), rate of change of an object's angular position over time, referenced to one of three axes: yaw, pitch, or roll. In a three dimensional coordinate system, as illustrated in FIG. 2, with respect to the vehicle 210, yaw 250 is a rotation around the z-axis 220, pitch 260 is a rotation around the x-axis 230, and roll 270 is a rotation around the y-axis 240.

A typical MEMS vibrating mass gyroscope detects a torsional force proportional to an applied angular rate. As an example, in a tuning fork gyroscope, the torsional force can be determined by measuring the capacitive displacement of tuning forks as a result of Coriolis forces. Although a three-axis gyroscope is generally used to measure the rate of change of the objects angular position in each of the three axes, single axis gyroscopes may also be used to measure rotation about other axes, for example, by adjusting its mounting orientation. Alternatively, multiple single axis gyroscopes can be used to measure rotation about each axes.

Accelerometers are typically used to determine the acceleration of an object in its own instantaneous rest frame. Since the accelerometer is fixed to the vehicle, it is unaware of its orientation. As a result, although the accelerometer 130 can measure linear acceleration in each axis, the acceleration is relative to the vehicles reference frame.

Generally, a MEMS accelerometer detects a displacement of a suspended proof mass attached to a reference frame using a mechanical suspension system. Positioned between the suspended proof mass and a pair of stationary electrodes are two nominally equal-sized common-mode sense capacitors. Acceleration at the MEMS sensor displaces the suspended proof mass from nominal position, resulting in an imbalance at the common-mode sense capacitors. This imbalance may be measured by a differential capacitance measurement, the change in capacitance creates a corresponding change in voltage, which may be amplified and/or digitized by an ASIC. The system translates the change in the sensor output to a calibrated value representing the proof mass movement, and therefore the applied acceleration.

Similar to a gyroscope, a three-axis accelerometer is typically used to measure acceleration of an object in each of the three axes. Alternatively, multiple single axis accelerometers may also be used to measure acceleration in each axes. In an embodiment a single accelerometer may be configured to measure acceleration in a direction perpendicular to the direction of the motion of the vehicle. In other embodiments, a single axis accelerometer can be reoriented and/or recalibrated to measure acceleration in each axes.

Figure 3:
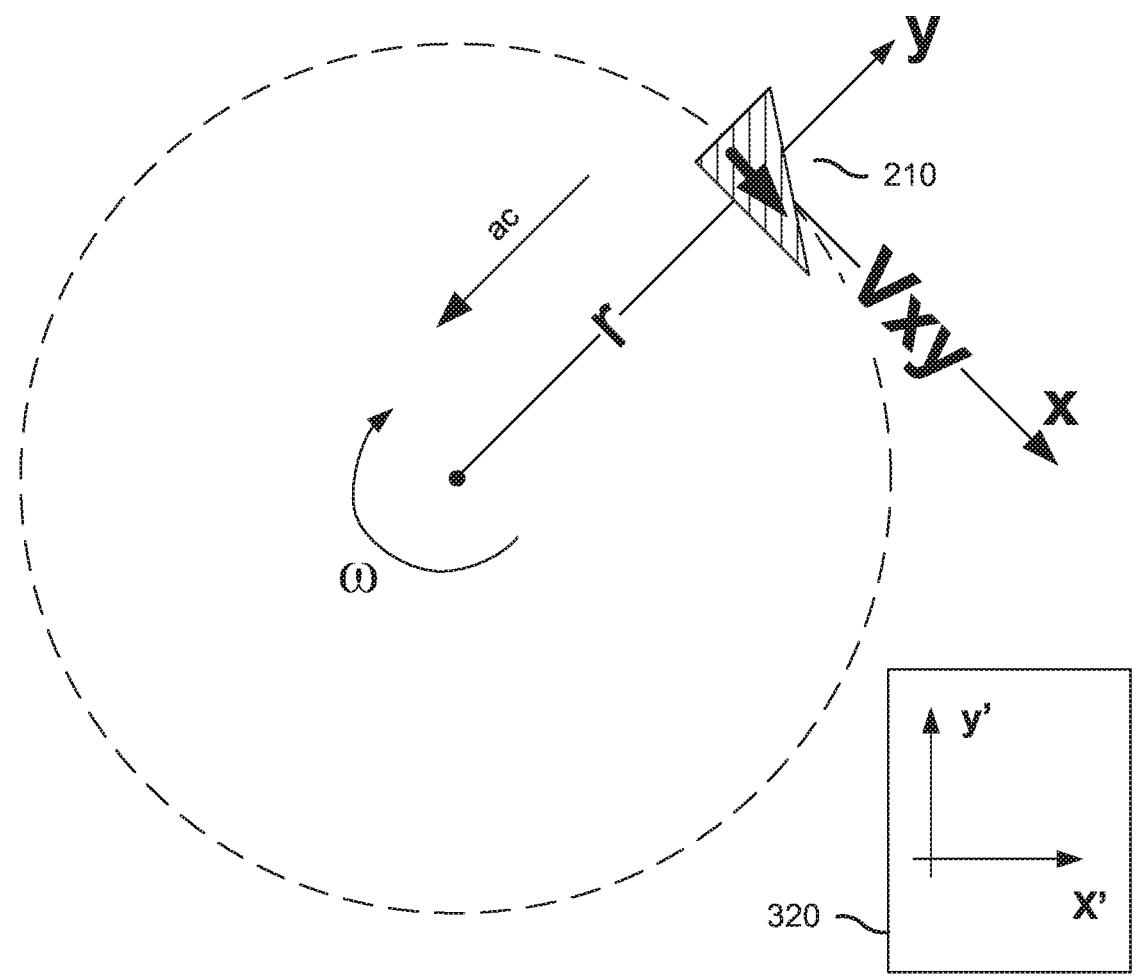
FIG. 3 illustrates an embodiment object travelling in in the x-y plane.
Figure 4A:
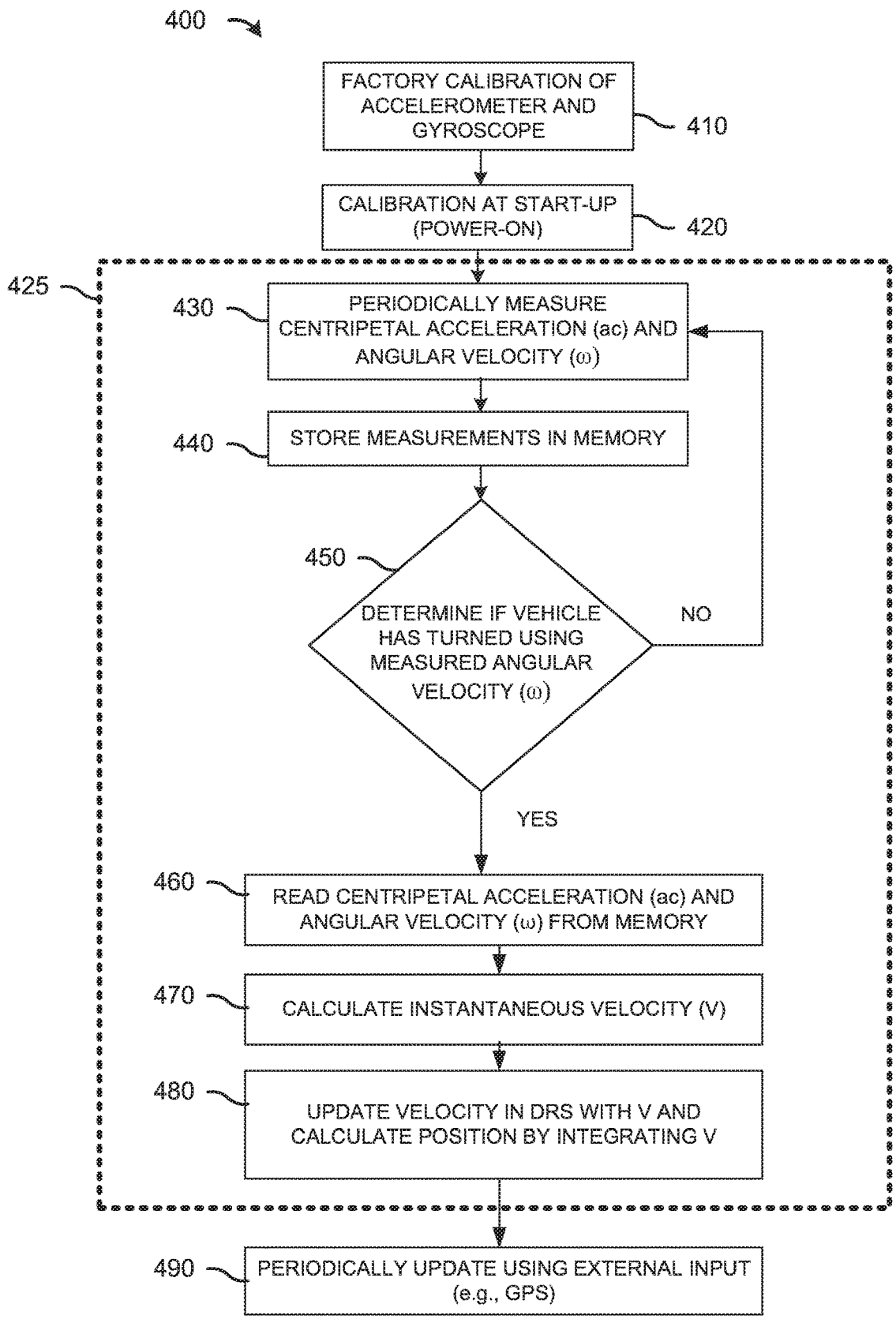
FIGS. 4A-B illustrate a flowchart of an embodiment for calculating velocity in a dead-reckoning system.
Figure 4B:
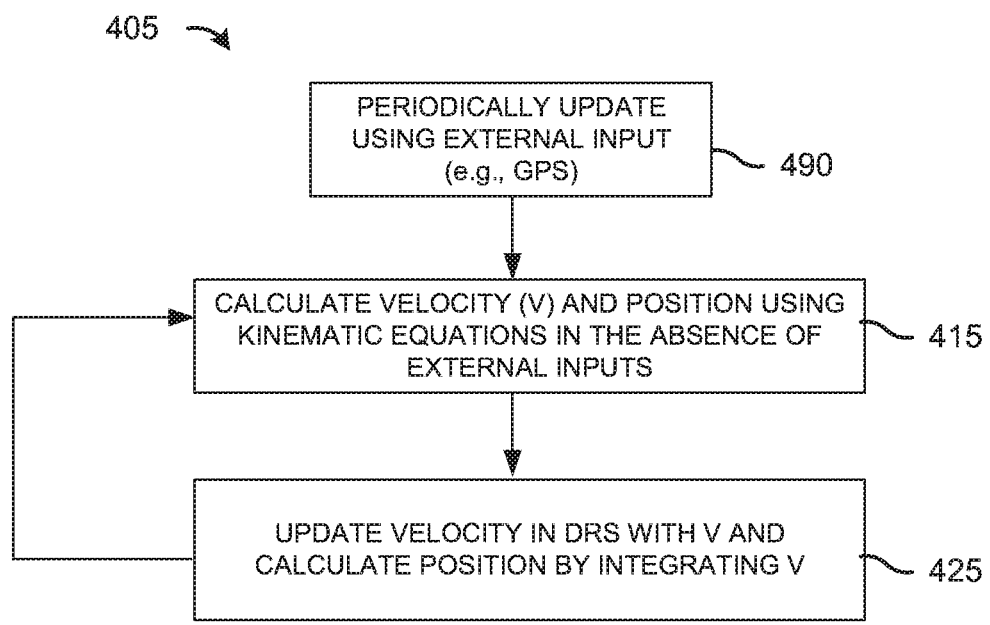

FIG. 3 illustrates an embodiment 300 of a vehicle 210 traversing in a clockwise direction along a perimeter of a circle having a radius (r) in the x'-y' reference plane (320). In this illustration, the circle is in an instantaneous fabric based on the turning radius (r) of the vehicle 210 during the turn. The vehicle 210 has an angular velocity ($\omega$) measured in radians per second. The linear velocity (V) of the vehicle 210 with respect to the radius (r) and angular velocity ($\omega$), may be calculated using the formula below.

$$V=\omega r$$

The formula above may be rearranged for radius (r)

$$r=V/\omega$$

Additionally, the vehicle 210 has a centripetal acceleration (ac) in a direction towards the center of the circle or in the negative y-axis direction of the vehicle's reference frame. The centripetal acceleration (ac) of the vehicle 210 is related to the linear velocity (V) and the radius (r) by the following formula.

$$ac=V^2/r$$

The radius (r) in the equation can be replaced with its counterpart with respect to linear velocity (V) and angular velocity ($\omega$) and the combined equation may be represented using the formula below.

$$ac = \frac{V^2}{\frac{V}{\omega}}$$

Rearranging the formula above for linear velocity (V), it can alternatively be represented with the following formula.

$$V=ac/\omega$$

In the embodiment, as illustrated in FIG. 3, the vehicle 210 has an angular velocity ($\omega$) when travelling on the x-y plane (travelling plane) and rotating around the z-axis. The measured yaw rate (gyro_yaw) of the vehicle 210 by the gyroscope is a measurement of the angular velocity ($\omega$) of the vehicle 210 while making a turn in the x-y plane. In another embodiment, when the vehicle is travelling on a y-z plane and rotating around the x-axis, the corresponding angular velocity ($\omega$) measured by the gyroscope 130 is the measured pitch rate. In yet another embodiment, when the vehicle is travelling on a z-x plane and rotating around the y-axis, the corresponding angular velocity ($\omega$) measured by the gyroscope 130 is the measured roll rate.

As previously stated, with respect to an accelerometer, the reference frame for an accelerometer 130 in the vehicle 210 is constant with respect to itself. Therefore, the centripetal acceleration (ac) of the vehicle 210 while traveling on a curved path corresponding to the x-y reference plane of the vehicle 210 travelling in its x-axis reference plane, can be measured using the y-axis acceleration (accel_y) of the accelerometer 130.

Therefore, the accelerometer 130 measures the centripetal acceleration (ac) and the gyroscope 140 measures the angular velocity ($\omega$) of the vehicle 210. The linear velocity (V) of the vehicle 210, after converting the angular velocity ($\omega$) from radians per second, can be calculated using the formula below.

$$Vxy = \frac{360 \times accel\_y}{2\pi \times gyro\_yaw}$$

As a result, the speed of the vehicle 210, while travelling in a curved path, may be calculated using the accelerometer 130 and the gyroscope 140 without suffering from integration drift. The calculated speed can be advantageously used to re-adjust the speed and position of the vehicle 210 and the apparatus 100, in a dead-reckoning system.

Advantageously, the speed of the vehicle is calculated independent of the acceleration or deceleration of the vehicle in the direction of motion.

The velocity that is calculated is in the vehicle's reference frame. For example, if an automobile is travelling uphill on an inclined plane and turns left or right, the calculated velocity represents the automobile's velocity along the inclined plane.

When applied for a vehicle, although roads are banked, this analysis is unchanged. In addition, even if the vehicle skids due to excessive speed at the turn, the sensed acceleration can be effectively used to determine the effective speed of the vehicle during the skidding.

Although FIG. 3 illustrates a vehicle travelling in a curved path having a centripetal acceleration (ac) in the y-axis in reference to its reference frame, the method as described above can be extended to all three axis.

FIG. 4A, illustrates a flowchart 400 of an embodiment for calculating velocity in a dead-reckoning system in accordance with measurements from an accelerometer 130 and a gyroscope 140, by an apparatus 100. At step 410, the accelerometer 130 and the gyroscope 140 are calibrated. The calibration can be done at the factory, where the reference frame of the sensors are defined for the vehicle 210.

At step 420, an initialization process may be initiated to make adjustments to the sensor measurements at start-up or power-on and record a known initial position and velocity. In an embodiment, measurements may include a correction factor as a result of a change in the center of gravity (g) of the vehicle 210. In another embodiment, the sensor measurements may include a correction as a result of a detection of a heading skew or skidding of the vehicle 210.

In an embodiment, a navigation device equipped with a GPS receiver, at the transition from GPS guidance to dead-reckoning navigation, the velocity and position of the vehicle is provided to the dead-reckoning system. In another embodiment, the initial position and velocity may be provided by an external source such as a cellular tower, an operator, or using a compass. In yet another embodiment, the device may be transitioning from a stationary position with a preset initial orientation. In yet another embodiment, the position of the vehicle may be calibrated through an initialization procedure using various on-board sensors or alternatively set at the factory. In summary, multiple methods may be possible to provide initial position and velocity to the navigation device during the transition to dead-reckoning navigation.

At step 430, the apparatus 100 will periodically measure the centripetal acceleration (ac) and the angular velocity ($\omega$). The periodic measurements, at known time intervals, allows the apparatus to search for any changes in the vehicle's angular travel. Additionally, the periodic measurements can provide correction parameters, such as determining gravity in the absence of any centripetal acceleration.

At step 440, the measurements are stored in a memory and at step 450 the angular velocity ($\omega$) is continuously monitored to determine if the vehicle has turned. At step 460, when it has been determined that the vehicle has turned, the measured centripetal acceleration (ac) and the angular velocity ($\omega$) are read back from memory. Alternatively, if the lag between detection and measurement is small, the processor may receive new measurements from the accelerometer 130 and the gyroscope 140 when a turn is detected. For example, this may be done to conserve power, where the accelerometer is powered-on after detecting an angular velocity ($\omega$).

At step 470, the dead-reckoning system (DRS) calculates the instantaneous velocity (V) in accordance with the embodiments of this disclosure. At step 480, the DRS uses the calculated velocity (V) to update the vehicle 210 velocity. Additionally, the instantaneous position is calculated by integrating the calculated instantaneous velocity (V) using kinematics equations.

At step 490, the dead-reckoning system (DRS) may periodically update the velocity and position, when available, using external inputs such as information received from a GPS receiver. The dead-reckoning system (DRS) may have an interface that can display a pre-loaded map that is stored in memory. When the apparatus 100 calculates the instantaneous velocity, at step 480, the apparatus 100 can then determine the location of the vehicle 210 using kinematic equations. Alternatively, the dead-reckoning system (DRS) may periodically connect with a GPS receiver to determine current position and velocity. In an embodiment, the dead-reckoning system (DRS) can advantageously use this information to introduce offsets, in subsequent calculations, to improve accuracy to account for unaccounted drifts in the movement.

FIG. 4B, illustrates a flowchart 405 of an embodiment for updating vehicle 210 velocity in a dead-reckoning system (DRS) in a turn and in the absence of a GPS reception. In the presence of GPS reception, at step 490, the vehicle 210, will periodically update its velocity and position. The GPS data can be from a GPS capable device within a navigation device installed on the vehicle, or alternatively, an external source that provides GPS data to the navigation device through an interface. In the absence of a GPS reception, at step 415, the vehicle 210 may calculate velocity (V) and position using kinematic equations while travelling on a straight path. The calculation at step 415 is based on standard dead-reckoning algorithms. When the dead-reckoning system (DRS) detects a change in direction in any axis, the dead-reckoning system (DRS) may calculate and update instantaneous velocity (V) using methods as described in step 425 of FIG. 4A. The position of the vehicle may then be calculated by integrating the instantaneous velocity. If the vehicle 210 is no longer traversing in a curved path, the dead-reckoning system (DRS) reverts back to step 415 to periodically update the position and velocity using kinematic equations. The periodic updating using kinematic equations continues until GPS reception has been restored, at which time the position and velocity (V) will be updated using the GPS data in step 490.

Figure 5A:
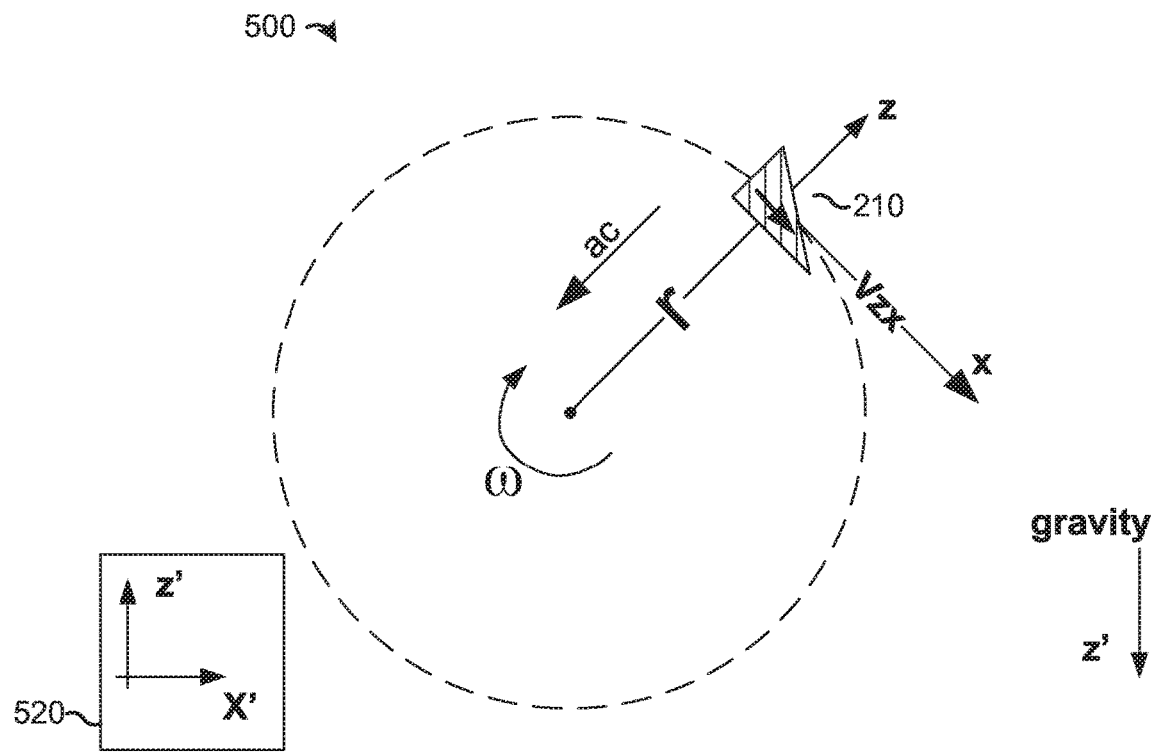
FIGS. 5A-C illustrate an embodiment object travelling respectively in the z-x and y-z planes.
Figure 6:
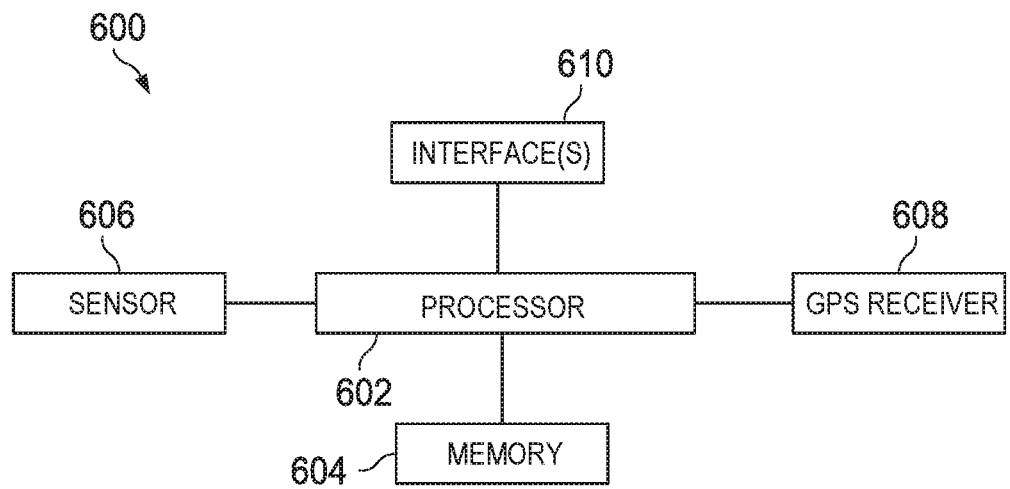
FIG. 6 illustrates a block diagram of an embodiment navigation device for performing methods described herein.

FIG. 5A illustrates an embodiment 500 of a vehicle 210 traversing in a clockwise direction along a perimeter of a circle having a radius (r) in the z'-x' reference plane (520). In this illustration, the circle is in an instantaneous fabric based on the turning radius (r) of the vehicle 210 during the turn. The z'-x' reference plane (520) corresponds to a typical Earth based reference frame, where the z' direction is vertical and away from the center of the earth. Gravity (g) acts on the vehicle 210 in the negative z'-axis direction.

In an embodiment, the centripetal acceleration (ac) of the vehicle 210 while travelling on a curved path corresponding to the z-x reference plane of the vehicle 210 and travelling in its x-axis reference plane can be measured using the z-axis acceleration (accel_z) of the accelerometer 130. An example for this embodiment can be an airplane moving in the x-axis and having an acceleration in the curved path corresponding to the z-x plane.

In the embodiment, the centripetal acceleration (ac) of the vehicle 210 is in the direction of the negative z-axis. The corresponding gyroscope measurement, as the vehicle 210 is rotating around the y-axis, is the measured roll rate (gyro_roll). The measured acceleration and gyroscope can be used to calculate the instantaneous linear velocity (Vzx) of the vehicle 210 in the z-x plane, referenced to the vehicle's reference frame.

$$Vzx = \frac{360 \times \text{accel\_z}}{2\pi \times \text{gyro\_roll}}$$

Figure 5B:
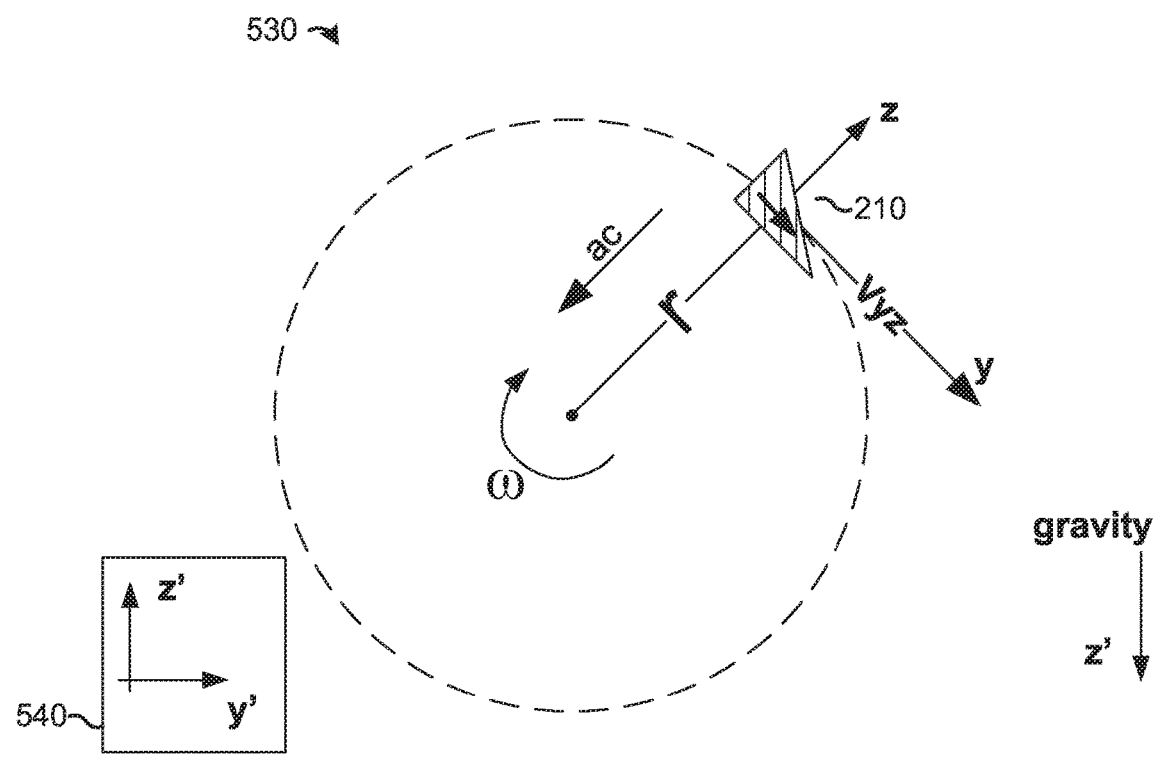
Figure 5C:
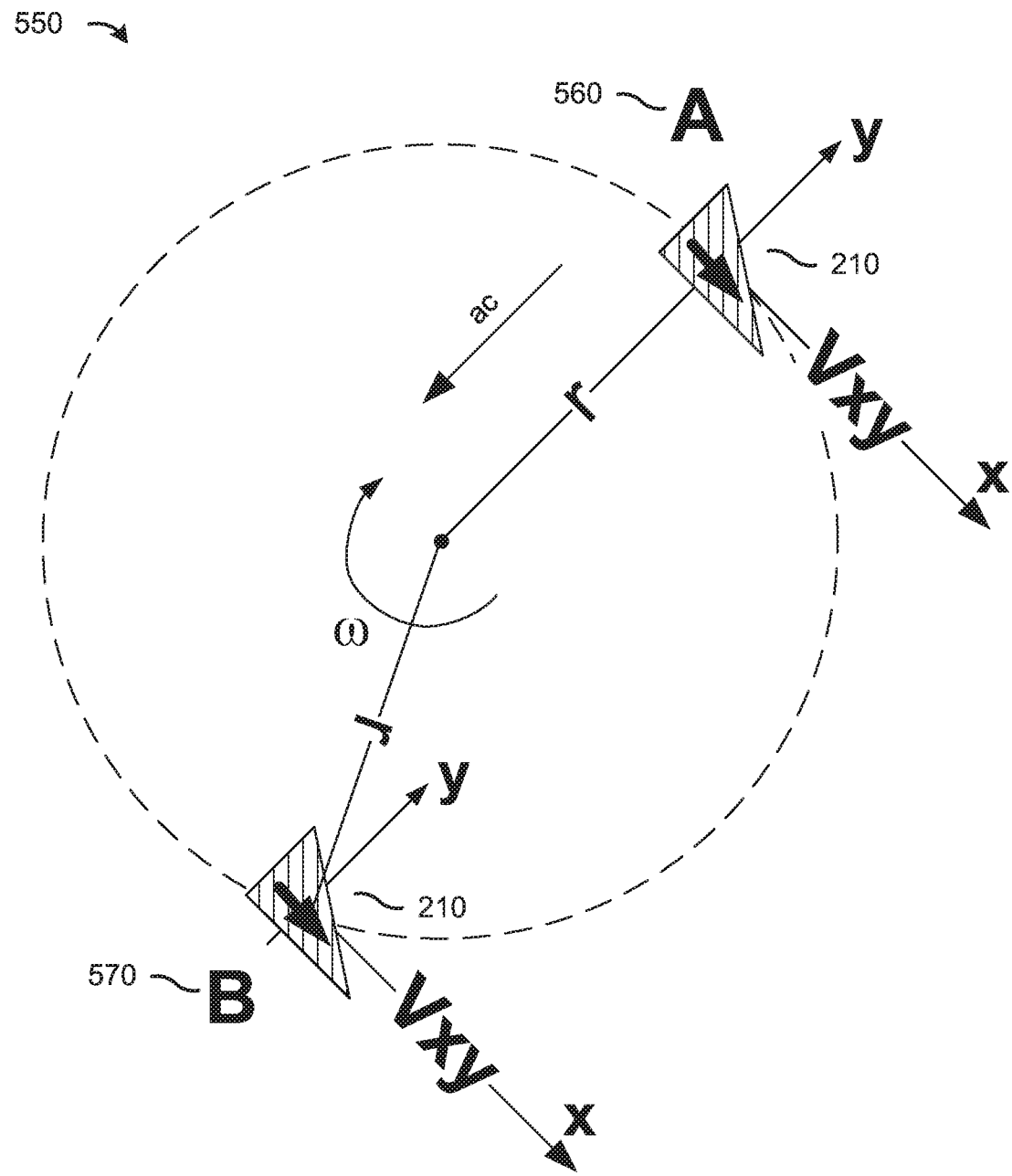

A similar calculation can be performed to calculate the instantaneous velocity (Vyz) of the vehicle 210 in the y'-z' plane. FIG. 5B illustrates an embodiment 530 of a vehicle 210 traversing in a clockwise direction along a perimeter of a circle having a radius (r) in the y'-z' reference plane (540). Similar to FIG. 5A, the circle is an instantaneous fabric based on the turning radius (r) of the vehicle 210 during the turn. The reference plane (540) has a z' coordinate that corresponds to a direction vertical and away from the center of the earth. The y' coordinate corresponds to a direction parallel to the surface of the earth and perpendicular to the z' axis.

In the embodiment, the centripetal acceleration (ac) of the vehicle 210 is in the direction of the negative z-axis. The corresponding gyroscope measurement, as the vehicle 210 is rotating around the x-axis, is the measured pitch rate (gyro_pitch). The measured acceleration and gyroscope can be used to calculate the instantaneous linear velocity (Vyz) of the vehicle 210 in the y-z plane, referenced to the vehicle's reference frame.

$$Vyz = \frac{360 \times \text{accel\_z}}{2\pi \times \text{gyro\_pitch}}$$

It is obvious that if the reference frame of the measuring sensor always points in the direction of the instantaneous velocity, the computed velocity is aligned with the reference frame. However, in practice, as illustrated in the embodiment 550 of FIG. 5C, this assumption may be broken since the sensor is rigidly attached to the vehicle 210. This may be a case for a flying vehicle 210 such as a helicopter where the direction of travel not be necessarily aligned with the orientation of the helicopter. In other words, the centripetal force may have contribution to all the axis of the sensor.

In an embodiment 550, the vehicle 210 is initially at a position A 560 and traversing a curved path, represented by a circle with a radius (r). If the orientation of the vehicle 210 in the turn is not in the direction of travel, the vehicle 210 arrives at position B 570. As a result of the discrepancy between the orientation and direction of movement, the centripetal acceleration of the vehicle has an x and y direction measurement. Therefore, a measurement using acceleration values from accelerometers pointed in both x and y directions can be used to calculate the effective centripetal acceleration. Since, in the illustration of FIG. 5C, there is only one angular velocity measurement (the other components being zero), the effective acceleration ($\sqrt{ax^2+ay^2}$) can be used along with the measured angular velocity.

In addition, if the vehicle 210 makes a fast series of turns in three dimensional space so that the measured acceleration is averaged over multiple turns, the resulting effective centrifugal acceleration would have contributions in possibly all dimensions. Therefore, for generality, embodiments of the invention may be applied to a vehicle 210 travelling in three-dimensional space. The vehicle 210, while travelling in the three-dimensional space can make a change in direction that has a corresponding velocity component Vxy, Vzx, and Vyz in the corresponding x-y, z-x, and y-z planes. The magnitude of the total instantaneous velocity (Vi) in terms of the components is a square root of the sum of the squared velocity components (Vxy, Vzx, Vyz) and can be calculated using the formula below.

$$Vi = \sqrt{Vxy^2 + Vyz^2 + Vzx^2}$$

The calculated velocity, in turn, can be used in a dead-reckoning system (DRS) to calculate the altitude change. The computed speed is in the vehicle's 210 reference system and may need to be converted into earth coordinate system if necessary.

Typically, the z-axis acceleration measured by the vehicle 210 includes a corresponding gravity (g) value. In an embodiment, the apparatus 100 in the vehicle 210 can make a correction using an estimated or measured value for gravity (g). Gravity (g) has a downward force in the z' direction of the earth reference frame and a corresponding vector force in the z direction of the vehicle's reference frame. The force of gravity (g) measured by the accelerometer 130 (az') in the vehicle 120 includes a gravity component, which is equal to the gravity (g) multiplied by the cosine of the angle (theta) between the axis z and z'.

$$\text{accel\_z'}_{meas} = \text{accel\_z} \pm g \cos(\text{theta})$$

Therefore, the actual centripetal acceleration experienced by the vehicle can be obtained by correcting for gravity (g), where the gravity component can be calculated prior to the turn when there is no centripetal acceleration.

A typical navigation devices provides an estimation for instantaneous position and velocity. The navigation device may include a GPS receiver or any other external navigational aid. Additionally, it may receive data from other devices, such as from surrounding vehicles, nearby radio antennas, or cellular devices or towers.

A moving object or vehicle may be equipped with the navigation device. The vehicle may be any mobile object such as an automobile, a ship, an airplane, a guided missile, drone, self-balancing personal transporters, or a bicycle. The navigation device may have a display that plots navigational information to a user in the vehicle. The navigation device may be a permanent or non-permanent component to the vehicle.

FIG. 6 illustrates a block diagram of an embodiment navigation device 600 for performing methods described herein, which may be installed in a host device. As shown, the navigation device 600 includes a processor 602, a memory 604, a sensor 606, a GPS receiver 608, and interface(s) 610, which may (or may not) be arranged as shown in FIG. 6. The navigation device 600 may include additional components not depicted in FIG. 6, such as long-term storage (e.g., non-volatile memory, etc.) or antennas.

The memory 604 may be any component or collection of components adapted to store programming and/or instructions for execution by the processor 602. In an embodiment, the memory 604 includes a non-transitory computer readable medium. The memory 604 may be a magnetic disk, an optical disc, a read-only memory (ROM), a random access memory (RAM), or the like. A part of the memory 604 may further include a non-volatile random access memory (NVRAM). The memory 604 stores the following elements, which include an executable module, or a data structure, or a subset thereof, or an extended set thereof. Operation instructions include various operation instructions and used for implementing various operations. An operating system may include various system programs and used for implementing various basic services and processing a hardware-based task. The memory 604, may additionally store the acceleration and angular velocity measurements from a gyroscope and an accelerometer.

The processor 602 may be any component or collection of components adapted to perform computations and/or other processing related tasks. The processor 602 may be a dedicated processor or a vehicle's central processor. In the embodiment of the present disclosure, the processor 602 may execute the following operations by invoking an operation instruction stored in the memory 604 (the operation instruction may be stored in the operating system). The operation instruction may enable the processor 602 to receive, by using the interface(s) 610, the measurements from memory 604, or alternatively directly from the gyroscope and the accelerometer. Additionally, the processor 602 may receive measurements from an ASIC (not shown). The processor 602, may periodically receive sensor measurements from the sensor 606. Alternatively, the processor 602, may receive the measurements from the sensor 606 corresponding to an application and sent by the ASIC (not shown), where the processor 602 is in a sleep state until it receives a sensor data corresponding to a change in direction of the navigation device 600, so that the processor 602 is conserving energy when the navigation device 600 is not traversing on a curved path. The processor 602 can then establish connection to the memory 604 and/or the sensor 606 to receive the acceleration and angular velocity measurements to calculate the instantaneous velocity.

In an embodiment, the sensor 606 may include a gyroscope and accelerometer sensor. The sensor 606 may also include an ASIC that receives the measurements from the gyroscope and the accelerometer. The ASIC, to conserve energy, may only monitor the measurements from one of the sensors. If the ASIC determines that the navigation device 600 is making a turn, the ASIC can then calculate the velocity and provide the calculated velocity to the processor. Alternatively, the ASIC can transmit the measurements to the processor 602 and/or memory 604. The sensor 606 may be a single package containing multiple sensors, an ASIC, and memory. Alternatively, the sensor 606 may be the collection of multiple sensors, an ASIC, and memory, where each component is individually packaged.

The GPS receiver 608 may be any device that receives GPS data from a GPS satellite. The GPS receiver 608 may be an external component connected to the navigation device, such as a cellular phone having a GPS receiver. The GPS receiver 608 may be connected to the navigation device (600) using the interface(s) 610. The GPS receiver 608 may be part of the navigation device 600, having antennas to receive the GPS coordinates and navigation information from one or more GPS satellites.

The interface 610 may be any component or collection of components that allow the navigation device 600 to communicate with other devices/components and/or a user. For example, the interface 610 may be adapted to communicate data, control, or management messages from the processor 602 to applications installed on the host device and/or a remote device. As another example, the interface 610 may be adapted to allow a user or user device (e.g., cellular phone, etc.) to interact/communicate with the navigation device 600. In yet another embodiment, the interface 610 may receive measurements from an accelerometer and a gyroscope external to the navigation device 600.

Figure 7:
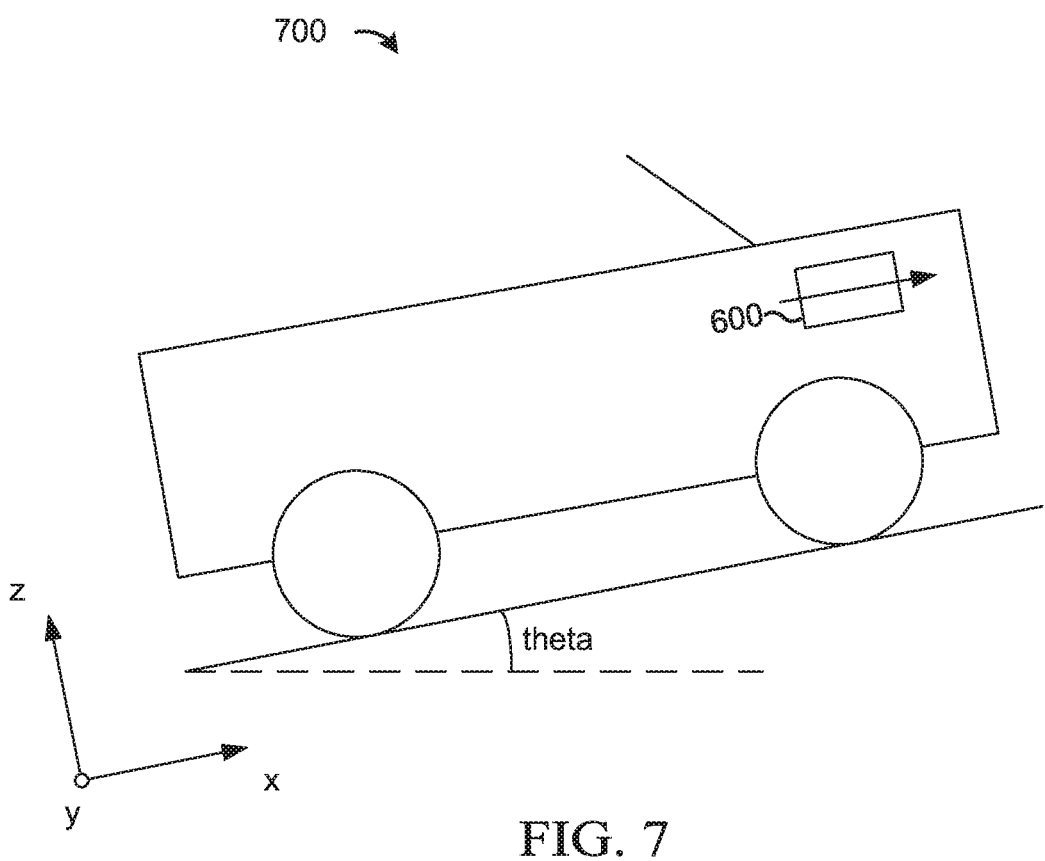
FIG. 7 illustrates an embodiment vehicle having a navigation device for performing methods described herein.
Figure 8:
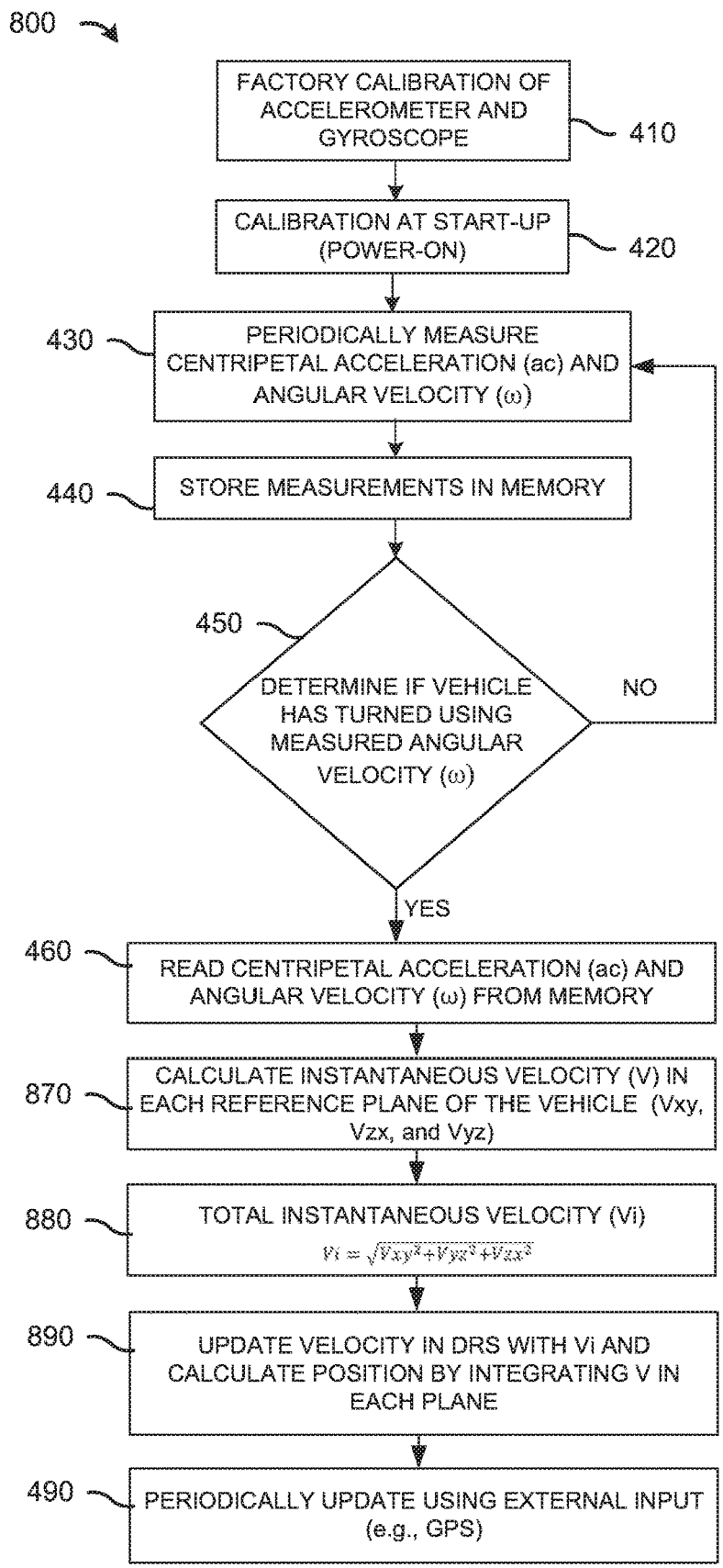
FIG. 8 illustrates a flowchart of an embodiment for calculating velocity in a dead-reckoning system in three-dimensional space.

FIG. 7 illustrates an embodiment 700 of a vehicle 210 with an embodiment navigation device 600 as illustrated in FIG. 6. The navigation device 600 may have a display interface visible to the user while the the location of other components may be strategically positioned on the vehicle 210 to capture an angular motion of the vehicle 210. As an example, the sensor 606 may be strategically and rigidly mounted to the vehicle 210 to measure acceleration and angular rotation during the vehicle's 210 motion. The sensors 210 may be rigidly mounted during installation such that the reference frame of the navigation device is static and known to the processor 602.

In this embodiment, the vehicle 210 may be an automobile capable of moving on an x-y plane referenced to the body of the vehicle 210. As shown in FIG. 7, the y-axis is perpendicular to the z-x plan referenced to the body of the vehicle 210. The speed of the vehicle in the x-y plane, referenced to the vehicle's reference frame, can be measured using the y-axis centripetal acceleration of an accelerometer 130 of the sensor 606. Any turn by the vehicle is a rotation around its z-axis and therefore the yaw rate is measured by the gyroscope 140 of the sensor 606. The y-axis centripetal acceleration and the yaw rate of the angular velocity is then used by the processor 602 in the navigation device 600 using the embodiments of this disclosure to calculate the vehicle's instantaneous velocity in the x-y plane.

Additionally, the vehicle 210 is travelling at an angle (theta) with respect to a flat surface of Earth. As a result, while the vehicle is traveling on the x-y plane and making a turn, the vehicle 210 has additional velocity vectors in the z-x and y-z planes which can be measured using the sensor 606 of the navigation device using the embodiments of this disclosure. The processor can then determine the total instantaneous velocity with respect to the earth's surface and subsequently calculate the device's current position using kinematic equations.

In some embodiments, the navigation device 600 may receive acceleration and angular velocity from more than one set of sensors located strategically and rigidly mounted on the vehicle to detect motion. Although, a single navigation device 600 is shown in FIG. 7, multiple navigation devices 600 may be located in larger vehicles. For example, a train with multiple compartments may include a navigation device 600 in multiple compartments in addition or as an alternative to one in the locomotive.

FIG. 8 illustrates a flowchart 800 of another embodiment for calculating velocity in a dead-reckoning system in accordance with measurements from an accelerometer 130 and a gyroscope 140, by the embodiment 700. The flow chart 800 uses the same reference numbers as flow chart 400 for designating elements corresponding to the previously as disclosed in reference to FIG. 4. The flowchart 800 differs from flowchart 400 to advantageously include steps to measure the velocity in the three planes. At step 870, the navigation device 600 calculates the instantaneous velocity of the vehicle in each of the reference planes Vxy, Vzx, and Vyz referenced to the vehicle's reference frame. The total instantaneous velocity (Vi) of the vehicle 210 is then calculated at step 880 using the calculated instantaneous velocity in each of the planes, $Vi=\sqrt{Vxy^2+Vyz^2+Vzx^2}$.

At step 890, the dead-reckoning system (DRS) uses the total instantaneous velocity (Vi) measured in step 880 to update the vehicle 210 velocity. Additionally, the instantaneous position is calculated by integrating the calculated instantaneous velocity (V) using kinematics equations in each plane.

The flowchart 800 can be applied to any vehicle 210 travelling in a three-dimensional coordinate system. As an example, the flowchart 800 can be applied to an airplane or flying drone capable of turning in all three directions (yaw, pitch, roll). Additionally, the flowchart 800 can be applied to a train or vehicle travelling on a non-flat surface for example travelling on a rugged terrain. In some instances, the change of direction can be in a single plane of travel and the associated velocity in other planes is zero. For sake of completeness, a vehicle 210 can measure the angular rotation in each axis and calculate the associated velocity in the respective plane. In the instance where no angular rotation has been registered in a particular plane, a respective value of zero can be used when calculating the total instantaneous velocity (Vi).

Figure 9:
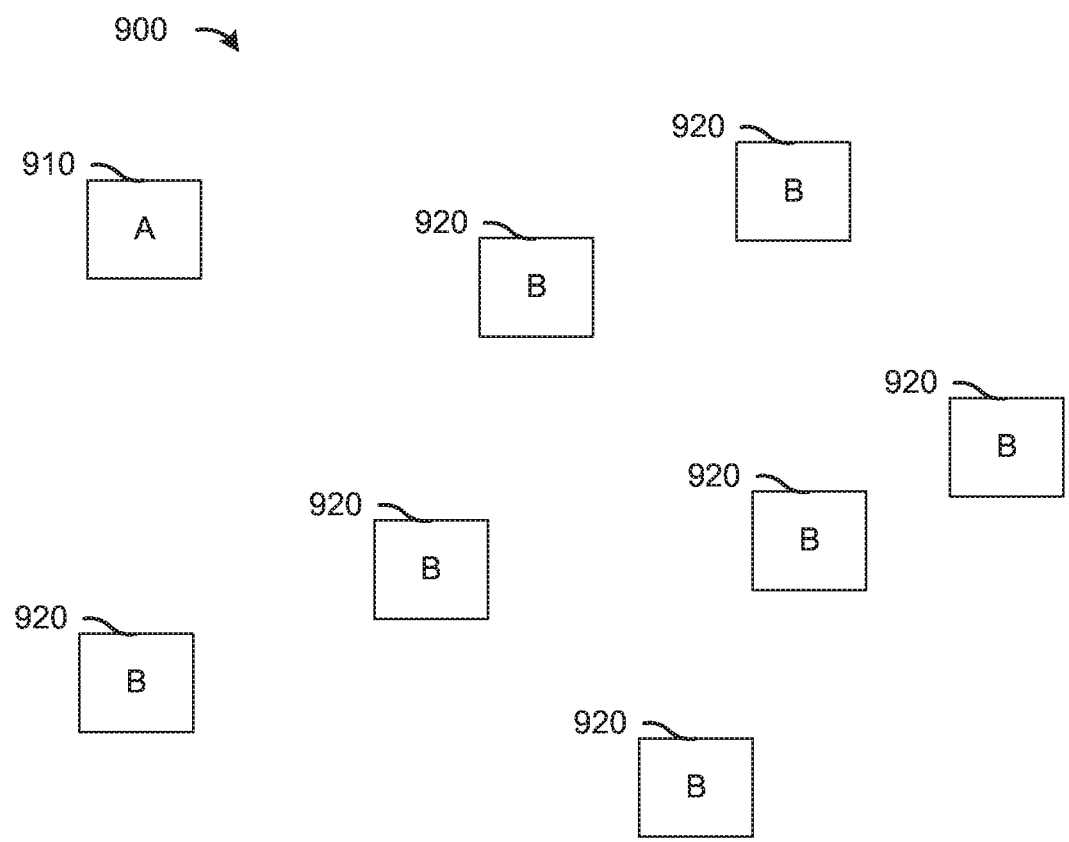
FIG. 9 illustrates an embodiment of a fleet of vehicle's advantageously performing methods described herein.

FIG. 9 illustrates an embodiment 900 illustrating a master vehicle 910 and a multitude of slave vehicles 920 that advantageously uses the methods presented in this disclosure. In an embodiment, the master vehicle 910 and the slave vehicles 920 may be unmanned aerial vehicle's (UAVs). In this embodiment, the master vehicle 910 and the slave vehicles may work in a collaborative environment, for example, to move a single object, for example, from a warehouse to a client's residence. Alternatively, the object may be moved within a closed environment within a warehouse.

In this example, the slave vehicles 920 movements are coordinated with the master vehicle 910 to interactively perform this task. A single user or automated device may control or provide initial guidance to the master vehicle 910. The embodiments of this disclosure provide an advantageous method to coordinate this activity by measuring the instantaneous velocity and position with a high degree of accuracy for each vehicle 910, 920 when making a change of direction.

In this example, each of the vehicle's 910, 920 may have a navigation device 600 that calculates the acceleration and angular velocity in a three-dimensional environment. The navigation device 600 in each vehicle 910, 920 may then calculate its velocity and position using the dead-reckoning system in this disclosure. In an embodiment, a feedback system may then be introduced to coordinate the movement of each slave vehicle 920 at an offset to the master vehicle 910 depending on the weight, size, or any other dependable factor of the object being transported.

The activity of multiple UAVs may be an automated task controlled by a program. The program may know the travel distance, source, and destination of the movement of the UAVs. The master vehicle 910 may initially receive this information from an external source. The master vehicle 910 or the external source may then set the course for delivery. The slave vehicle's 920 may then coordinate the movement of the object by synchronizing with the master vehicle 910 during flight.

To improve accuracy, the slave vehicle's 920 may be initialized prior to liftoff by being placed in initial known positions. Alternatively, each vehicle 910 920 may periodically receive position coordinates and velocity from an external source to improve accuracy of the dead-reckoning system. The vehicle's may use this advantageously to reduce coordination with external sources to conserve power.

In an embodiment, the role of the master vehicle 910, during flight, may be transferred over to one of the slave vehicle's 920 to balance power consumption across the multiple UAVs. The master vehicle 910 may periodically and at advantageous intervals make a change in direction to measure velocity and position using the embodiments of this disclosure.

In another embodiment, the master vehicle 910 and the slave vehicle's 920 may be autonomous cars and/or trucks navigating on a roadway or autonomous vehicle's navigating in an underground passage. In this embodiment, the master vehicle 910 and the slave vehicle's 920 may navigate the terrain using embodiments of this disclosure in a dead-reckoning system (DRS). The slave vehicle's 920 may have a communication link to the master vehicle 910 using antennas or another form of digital tethering. In some embodiments, the vehicle's 910, 920 may be navigating underground or in areas with poor reception with respect to external navigation aids such as GPS receivers. In this embodiment, a dead-reckoning system (DRS) employed within the fleet is advantageous in providing significant improvements in accuracy with respect to speed and position of the vehicle's and their speed and position with respect to each other.

Example embodiments of the present invention are summarized here. Other embodiments can also be understood from the entirety of the specification and the claims filed herein.

Example 1

A method for determining a speed of a vehicle in a dead-reckoning system, the method includes measuring a centripetal acceleration, using an accelerometer sensor, of the vehicle traversing a curved path on a plane of travel. The method also includes measuring an angular velocity, using a gyroscope sensor, of the vehicle, and calculating the speed of the vehicle from the centripetal acceleration and the angular velocity.

Example 2

The method of example 1, where the method further includes calibrating the accelerometer sensor and the gyroscope sensor prior to measuring.

Example 3

The method of example 1, where determining the velocity of the dead-reckoning system in the plane of travel is calculated by dividing the centripetal acceleration by the angular velocity.

Example 4

The method of example 1, where determining the velocity of the dead-reckoning system is calculated using the formula:

$$V = \frac{360 \times \text{Accel}}{2\pi \times \text{Gyro}}$$

Accel is the centripetal acceleration measured by the accelerometer sensor and Gyro is an angular velocity measured by the gyroscope sensor in accordance with a rotation on the plane of travel.

Example 5

The method of example 1, where the centripetal acceleration corresponds to an acceleration in the direction perpendicular to the direction of motion during the traversing of the curved path.

Example 6

The method of example 1, where the method further includes measuring the angular velocity periodically to determine if the vehicle has turned.

Example 7

The method of example 1, where the method further includes storing the measured angular velocity and the measured centripetal acceleration in a memory, and reading the measured angular velocity and the measured centripetal acceleration from memory.

Example 8

The method of example 1, where measuring the centripetal acceleration further includes measuring the centripetal acceleration in each of a x-y plane, z-x plane, and y-z plane of the vehicle that the vehicle is traveling in a three-dimensional coordinate system.

Example 9

The method of examples 1 and 8, where measuring the angular velocity further includes measuring a pitch angular velocity, a yaw angular velocity, and a roll angular velocity.

Example 10

The method of examples 1, 8, and 9, where calculating the speed further includes calculating an instantaneous velocity in the x-y plane by dividing the centripetal acceleration in the y-axis and the angular velocity in the yaw axis, calculating an instantaneous velocity in the z-x plane by dividing the centripetal acceleration in the z-axis and the angular velocity in the roll axis, and calculating an instantaneous velocity in the y-z plane by dividing the centripetal acceleration in the z-axis and the angular velocity in the pitch axis.

Example 11

The method of examples 1, 8, 9, and 10, where the method further includes determining a total instantaneous velocity, the total instantaneous velocity being calculated by taking the square root of the sum of the instantaneous velocity in the x-y plane squared, instantaneous velocity in the z-x plane squared, and instantaneous velocity in the y-z plane squared.

Example 12

An application is embedded in a non-transitory computer readable medium and intended for execution on a dead-reckoning system. The application is configured to determine a speed of a vehicle in the dead-reckoning system travelling in a curved path in accordance with a measured centripetal acceleration and a measured angular velocity.

Example 13

The application of example 12, where determining the speed of the vehicle in the dead-reckoning system is calculated using the formula:

$$V = \frac{360 \times \text{Accel}}{2\pi \times \text{Gyro}}$$

where Accel is the centripetal acceleration measured by an accelerometer and Gyro is an angular velocity measured by a gyroscope in accordance with a rotation on the plane of travel.

Example 14

An apparatus includes an accelerometer, a gyroscope, a processor, and a memory storing a program to be executed in the processor. The accelerometer and the gyroscope are configured to be rigidly mounted to a vehicle. The gyroscope is configured to be proximate to the accelerometer. The program includes instructions to determine whether the gyroscope detected turning of the vehicle, determine a speed of the vehicle during the turn from a centripetal acceleration detected by the accelerometer and the angular velocity detected by the gyroscope, and updating the vehicle speed in a dead-reckoning system with the determined speed.

Example 15

The apparatus of example 14, where the instructions further include calibrating the accelerometer sensor and the gyroscope sensor prior to detecting the centripetal acceleration and the angular velocity.

Example 16

The apparatus of example 14, where determining the speed of the vehicle is calculated by dividing the centripetal acceleration by the angular velocity.

Example 17

The apparatus of example 14, where determining the speed of the vehicle is calculated using the formula:

$$V = \frac{360 \times \text{Accel}}{2\pi \times \text{Gyro}}$$

where Accel is the centripetal acceleration measured by the accelerometer and Gyro is an angular velocity measured by the gyroscope in accordance with a rotation on the plane of travel.

Example 18

The apparatus of example 14, where the centripetal acceleration corresponds to an acceleration in the direction perpendicular to the direction of motion during the traversing of the curved path.

Example 19

The apparatus of example 14, where the instructions further include measuring the angular velocity periodically to determine if the vehicle has turned.

Example 20

The apparatus of example 14, where the instructions further includes storing the measured angular velocity and the measured centripetal acceleration in a memory, and reading the measured angular velocity and the measured centripetal acceleration from memory.

Example 21

The apparatus of example 14, where the instructions further include measuring the centripetal acceleration in each of a x-y plane, z-x plane, and y-z plane of the vehicle that the vehicle is traveling in a three-dimensional coordinate system.

Example 22

The apparatus of examples 14 and 21, where the instructions further include measuring a pitch angular velocity, a yaw angular velocity, and a roll angular velocity.

Example 23

The apparatus of examples 14, 21, and 22, where the updating the vehicle speed further includes calculating an instantaneous velocity in the x-y plane by dividing the centripetal acceleration in the y-axis and the angular velocity in the yaw axis, calculating an instantaneous velocity in the z-x plane by dividing the centripetal acceleration in the z-axis and the angular velocity in the roll axis, and calculating an instantaneous velocity in the y-z plane comprising by the centripetal acceleration in the z-axis and the angular velocity in the pitch axis.

Example 24

The apparatus of examples 14, 21, 22, and 23, where the instructions further include determining a total instantaneous velocity. The total instantaneous velocity is calculated by taking the square root of the sum of the instantaneous velocity in the x-y plane squared, instantaneous velocity in the z-x plane squared, and instantaneous velocity in the y-z plane squared.

Example 25

A vehicle includes an accelerometer, a gyroscope, a processor, and a memory storing a program to be executed in the processor. The accelerometer and the gyroscope are configured to be rigidly mounted to the vehicle. The gyroscope is configured to be proximate to the accelerometer. The program includes instructions to determine whether the gyroscope detected turning of the vehicle, determine a speed of a vehicle during the turn from a centripetal acceleration detected by the accelerometer and the angular velocity detected by the gyroscope, and updating a vehicle speed in a dead-reckoning system with the determined speed.

Example 26

The vehicle of example 25, where the instructions further include calibrating the accelerometer sensor and the gyroscope sensor prior to detecting the centripetal acceleration and the angular velocity.

Example 27

The vehicle of example 25, where determining the speed of the vehicle is calculated by dividing the centripetal acceleration by the angular velocity.

Example 28

The vehicle of example 25, where determining the speed of the vehicle is calculated using the formula:

$$V = \frac{360 \times \text{Accel}}{2\pi \times \text{Gyro}}$$

where Accel is the centripetal acceleration measured by the accelerometer and Gyro is an angular velocity measured by the gyroscope in accordance with a rotation on the plane of travel.

Example 29

The vehicle of example 25, where the centripetal acceleration corresponds to an acceleration in the direction perpendicular to the direction of motion during the traversing of the curved path.

Example 30

The vehicle of example 25, where the instructions further include measuring the angular velocity periodically to determine if the vehicle has turned.

Example 31

The vehicle of example 25, where the instructions further includes storing the measured angular velocity and the measured centripetal acceleration in a second memory, and reading the measured angular velocity and the measured centripetal acceleration from the second memory.

Example 32

The vehicle of example 25, where the instructions further include measuring the centripetal acceleration in each of a x-y plane, z-x plane, and y-z plane of the vehicle that the vehicle is traveling in a three-dimensional coordinate system.

Example 33

The vehicle of examples 25 and 32, where the instructions further include measuring a pitch angular velocity, a yaw angular velocity, and a roll angular velocity.

Example 34

The vehicle of examples 25, 32, and 33, where updating the vehicle speed further includes calculating an instantaneous velocity in the x-y plane by dividing the centripetal acceleration in the y-axis and the angular velocity in the yaw axis, calculating an instantaneous velocity in the z-x plane by dividing the centripetal acceleration in the z-axis and the angular velocity in the roll axis, and calculating an instantaneous velocity in the y-z plane comprising by the centripetal acceleration in the z-axis and the angular velocity in the pitch axis.

Example 35

The vehicle of examples 25, 32, 33, and 34, where the instructions further include determining a total instantaneous velocity. The total instantaneous velocity is calculated by taking the square root of the sum of the instantaneous velocity in the x-y plane squared, instantaneous velocity in the z-x plane squared, and instantaneous velocity in the y-z plane squared.

Example 36

A fleet of vehicles comprising a master vehicle and a plurality of slave vehicles, the master vehicle and each of the slave vehicles having a dead-reckoning system (DRS) comprising an accelerometer, a gyroscope, a processor, and a memory storing a program to be executed in the processor. The program comprising instructions to determine whether the gyroscope detected a turning motion, determine the speed of each vehicle during the turn from a centripetal acceleration detected by the accelerometer and an angular velocity detected by the gyroscope, updating a speed of each vehicle with the determined speed.

Example 37

The fleet of vehicles of example 36, where the slave vehicles movement is coordinated with the master vehicle in accordance with the determined speed.

Example 38

The fleet of vehicles of example 36, where the initial position of the vehicles are initialized prior to initial movement.

Example 39

The fleet of vehicles of example 36, where the role of master and slave is interchanged between the vehicles to conserve energy.

Example 40

The vehicle of example 25, where the instruction further comprises detecting a low or absence of a global positioning satellite (GPS) signal to update the vehicle speed in a dead-reckoning system with the determined speed.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are executed in the processor. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
    continuously monitoring a change in a direction of a vehicle using a gyroscope; and
    detecting the change in the direction of the vehicle, and, based thereon:
        measuring a centripetal acceleration of the vehicle using an accelerometer,
        measuring an angular velocity of the vehicle using the gyroscope, and
        calculating a linear velocity of the vehicle from the centripetal acceleration and the angular velocity.

2. The method of claim 1, further comprising calibrating the accelerometer and the gyroscope prior to the measuring.

3. The method of claim 1, wherein calculating the linear velocity comprises dividing the centripetal acceleration by the angular velocity.

4. The method of claim 1, wherein calculating the linear velocity comprises using the formula:

$$V = \frac{360 \times \text{Accel}}{2\pi \times \text{Gyro}}$$

where Accel is the centripetal acceleration measured by the accelerometer and Gyro is an angular velocity measured by the gyroscope in accordance with the change in the direction of the vehicle.

5. The method of claim 1, wherein the method further comprises detecting a weak or an absence of a global positioning satellite (GPS) reception.

6. The method of claim 1, further comprising powering up the accelerometer in response to detecting the change in the direction of the vehicle.

7. The method of claim 1, further comprising:
    periodically storing the angular velocity and the centripetal acceleration in a memory; and
    reading the angular velocity and the centripetal acceleration from the memory upon detecting the change in the direction of the vehicle.

8. The method of claim 1, wherein measuring the centripetal acceleration comprises measuring the centripetal acceleration in each of a x-y plane, z-x plane, and y-z plane of the vehicle traveling in a three-dimensional coordinate system.

9. The method of claim 8, wherein measuring the angular velocity comprises measuring a pitch angular velocity, a yaw angular velocity, and a roll angular velocity.

10. The method of claim 9, wherein calculating the linear velocity of the vehicle comprises:
    calculating an instantaneous velocity in the x-y plane comprising dividing y-axis centripetal acceleration and the yaw angular velocity;
    calculating an instantaneous velocity in the z-x plane comprising dividing z-axis centripetal acceleration and the roll angular velocity; and
    calculating an instantaneous velocity in the y-z plane comprising dividing the z-axis centripetal acceleration and the pitch angular velocity.

11. The method of claim 10, further comprising determining a total instantaneous velocity, wherein the total instantaneous velocity is calculated by taking square root of a sum of the instantaneous velocity in the x-y plane squared, instantaneous velocity in the z-x plane squared, and instantaneous velocity in the y-z plane squared.

12. A vehicle comprising:
    an accelerometer configured to be rigidly mounted to the vehicle;
    a gyroscope configured to be rigidly mounted to the vehicle and being proximate to the accelerometer;
    a processor; and
    a memory storing a program to be executed in the processor, the program comprising instructions to:
        continuously monitor a change in a direction of the vehicle using the gyroscope; and
        detect the change in the direction of the vehicle, and, based thereon:
            measure a centripetal acceleration of the vehicle using the accelerometer, measure an angular velocity of the vehicle using the gyroscope, and calculate a linear velocity of the vehicle from the centripetal acceleration and the angular velocity.

13. The vehicle of claim 12, wherein calculating the linear velocity is calculated by dividing the centripetal acceleration by the angular velocity.

14. The vehicle of claim 12, wherein calculating the linear velocity is calculated using the formula:

$$V = \frac{360 \times \text{Accel}}{2\pi \times \text{Gyro}}$$

where Accel is the centripetal acceleration measured by the accelerometer and Gyro is an angular velocity measured by the gyroscope in accordance with the change in the direction of the vehicle.

15. The vehicle of claim 12, wherein measuring the centripetal acceleration comprises measuring the centripetal acceleration in each of a x-y plane, z-x plane, and y-z plane of the vehicle traveling in a three-dimensional coordinate system.

16. The vehicle of claim 15, wherein measuring the angular velocity comprises measuring a pitch angular velocity, a yaw angular velocity, and a roll angular velocity.

17. The vehicle of claim 16, wherein calculating the linear velocity of the vehicle comprises:

calculating an instantaneous velocity in the x-y plane comprising dividing y-axis centripetal acceleration and the yaw angular velocity;

calculating an instantaneous velocity in the z-x plane comprising dividing z-axis centripetal acceleration and the roll angular velocity; and calculating an instantaneous velocity in the y-z plane comprising dividing z-axis centripetal acceleration and the pitch angular velocity.

18. A fleet of vehicles comprising a master vehicle and a plurality of slave vehicles, wherein the master vehicle and each of the slave vehicles operate in accordance with the vehicle of claim 12.

19. The fleet of vehicles of claim 18, wherein a coordinated movement between the master vehicle and the slave vehicles is in accordance with an updated speed and position calculated at each slave vehicle in reference to the master vehicle.

20. An apparatus comprising:

an accelerometer configured to be rigidly mounted to a vehicle;

a gyroscope configured to be rigidly mounted to the vehicle proximate to the accelerometer;

a processor; and a memory storing a program to be executed in the processor, the program comprising instructions to:

continuously monitor a change in a direction of the vehicle using the gyroscope; and detect the change in the direction of the vehicle, and based thereon:

measure a centripetal acceleration of the vehicle using the accelerometer, measure an angular velocity of the vehicle using the gyroscope, and calculate a linear velocity of the vehicle from the centripetal acceleration and the angular velocity.

21. The apparatus of claim 20, wherein calculating the linear velocity comprises dividing the centripetal acceleration by the angular velocity.

22. The apparatus of claim 20, wherein calculating the linear velocity comprises using the formula:

$$V = \frac{360 \times \text{Accel}}{2\pi \times \text{Gyro}}$$

where Accel is the centripetal acceleration measured by the accelerometer and Gyro is an angular velocity measured by the gyroscope in accordance with the change in the direction of the vehicle.

23. The apparatus of claim 20, wherein measuring the centripetal acceleration comprises measuring the centripetal acceleration in each of a x-y plane, z-x plane, and y-z plane of the vehicle that the vehicle is traveling in a three-dimensional coordinate system; wherein the angular velocity comprises a pitch angular velocity, a yaw angular velocity, and a roll angular velocity; and wherein calculating the linear velocity of the vehicle comprises:

calculating an instantaneous velocity in the x-y plane comprises dividing y-axis centripetal acceleration and the yaw angular velocity;

calculating an instantaneous velocity in the z-x plane comprising dividing z-axis centripetal acceleration and the roll angular velocity; and calculating an instantaneous velocity in the y-z plane comprising dividing z-axis centripetal acceleration and the pitch angular velocity.

24. A non-transitory computer-readable medium storing computer instructions for determining a speed of a vehicle in a dead-reckoning system, that when executed by a processor, causes the processor to perform the steps of:

continuously monitoring a change in a direction of the vehicle using a gyroscope; and detecting the change in the direction of the vehicle, and, based thereon:

measuring a centripetal acceleration of the vehicle using an accelerometer, measuring an angular velocity of the vehicle using the gyroscope, and calculating a linear velocity of the vehicle from the centripetal acceleration and the angular velocity.

25. The non-transitory computer-readable medium of claim 24, wherein calculating the linear velocity comprises using the formula:

$$V = \frac{360 \times \text{Accel}}{2\pi \times \text{Gyro}}$$

where Accel is the measured centripetal acceleration by the accelerometer and Gyro is the angular velocity measured by the gyroscope in accordance with the change in the direction of the vehicle.

* * * * *